US008130388B2

(12) United States Patent
Noda

(10) Patent No.: US 8,130,388 B2
(45) Date of Patent: Mar. 6, 2012

(54) METHOD FOR ADJUSTING A PRINTING POSITION FOR A PRINTING APPARATUS

(75) Inventor: Noriyuki Noda, Hatamachi (JP)

(73) Assignee: Seiko Epson Corporation, Tokyo (JP)

( * ) Notice: Subject to any disclaimer, the term of this patent is extended or adjusted under 35 U.S.C. 154(b) by 1105 days.

(21) Appl. No.: 11/698,497

(22) Filed: Jan. 25, 2007

(65) Prior Publication Data

US 2007/0188809 A1 Aug. 16, 2007

(30) Foreign Application Priority Data

Jan. 25, 2006 (JP) ................................ P2006-016002

(51) Int. Cl.
*G06F 3/12* (2006.01)
*H04N 1/00* (2006.01)

(52) U.S. Cl. ........................................ 358/1.13; 358/1.1

(58) Field of Classification Search .................. 358/1.1, 358/1.8, 1.9, 1.12, 1.13, 1.14, 1.15, 1.18, 358/448, 400, 474; 345/629; 347/43
See application file for complete search history.

(56) References Cited

U.S. PATENT DOCUMENTS 5,927,208 A * 7/1999 Hagstrom et al. ............ 101/486
7,178,891 B2 * 2/2007 Takamiya ......................... 347/5
2002/0033959 A1 3/2002 Ando et al.
2004/0070789 A1 * 4/2004 Meerwald et al. ........... 358/1.16
2004/0119991 A1 * 6/2004 Kubota .......................... 358/1.5
2005/0012760 A1 * 1/2005 Yamamoto .................... 345/636
2005/0134642 A1 * 6/2005 Morikawa et al. .............. 347/43
2005/0169684 A1 * 8/2005 Mochizuki ...................... 400/23
2006/0018243 A1 * 1/2006 Ohtsubo et al. ............ 369/272.1
2006/0078364 A1 * 4/2006 Kimura et al. ................ 400/621
2007/0013719 A1 * 1/2007 Yamamoto .................... 345/629

FOREIGN PATENT DOCUMENTS

JP 2002-292964 A 10/2002
JP 2003-266855 A 9/2003
JP 2003-266855 A 9/2003
JP 2004-058366 A 2/2004
JP 2004-114357 4/2004
JP 2005-007595 A 1/2005
JP 2005-246699 A 9/2005
JP 2005-246699 A 9/2005

* cited by examiner

*Primary Examiner* — Gabriel Garcia
(74) *Attorney, Agent, or Firm* — Nutter McClennen & Fish LLP; John J. Penny, Jr.; Christina M. Sperry

(57) ABSTRACT

There is disclosed a method executed in a printing apparatus operable to read out data from a recording medium and to execute printing based on the read-out data with respect to a printing medium. A first mode for selecting a type of the printing is effected. A prescribed command is received after the first mode is effected. A second mode for adjusting a printing position relative to the printing medium is effected when the prescribed command is received. The printing position is adjusted when the second mode is effected. The first mode is effected when the adjusting of the printing position is finished, with a condition that is effected when the prescribed command is received.

14 Claims, 7 Drawing Sheets

METHOD FOR ADJUSTING A PRINTING POSITION FOR A PRINTING APPARATUS

BACKGROUND

1. Technical Field

The present invention relates to a printing apparatus, and more particularly, to a printing apparatus for reading an image file from an inserted portable recording medium and performing printing.

2. Related Art

The popularization of digital cameras has led to an increasing request for direct printers that are directly connected with a portable recording medium (for example, a memory card) without a host computer to perform printing.

Among such direct printers, there are printers which can perform a printing operation to a label surface of a CD-R or a seal sheet of paper (also referred to as "divided seal sheet of paper") having cut lines therein. Such a printer is disclosed in Japanese Patent Publication No. 2004-114357A (JP-A-2004-114357).

When the printing operation is performed to the label surface of a CD-R or the divided seal sheet of paper, unlike the printing operation to a general sheet of paper, it is important that the printing operation is performed with higher positioning accuracy. For example, when a specified image does not enter but departs from the range designated by a user at the time of the printing operation to the label surface, the printed matters have an ill appearance. When a plurality of images does not enter a frame surrounded with the cut lines at the time of the printing operation to the divided seal sheet of paper, seals having an ill appearance including neighboring images are obtained at the time of separating the seals.

In view of such a problem, a printer which can adjust a printing position with respect to a printing medium is known. Such a printer adjusts the positions in accordance with a user's instruction by effecting a positioning mode when a setup button is depressed.

FIG. 7 shows a flow of processes of printing a label on a CD in such a printer. Upon activation, the printer waits for the selection of a printing mode (such as "general printing mode from a memory cards", "CD label printing mode", and "divided seal sheet printing mode") (step S51). When the "CD label printing mode" is selected, the printer effects the selected mode (step S52) and receives the selection of an image to be printed (step S53). When receiving a printing instruction after selecting an image, the printer prints the selected image on the label surface of the CD (step S54).

In such a process, it is assumed that a user tries to adjust the printing position after effecting the "CD label printing mode." In the printer, when the setup button is depressed, the "CD label printing mode" is terminated and a "setup mode" is effected, thereby displaying a menu including a "positioning mode" (step S55). Then, when the user selects the "positioning mode", the "positioning mode" is effected (step S56). Thereafter, when the positioning is finished, the printer is returned to the process of first waiting for a printing mode (step S51).

Accordingly, when the user once selects the positioning mode, the user should select again the "CD label printing mode" from the original menu and select again an image to be printed. Such operations are bothersome.

SUMMARY

It is therefore one advantageous aspect of the invention to adjust a printing position with respect to a printing medium without involving bothersome operations.

According to one aspect of the invention, there is provided a method executed in a printing apparatus operable to read out data from a recording medium and to execute printing based on the read-out data with respect to a printing medium, the method comprising:

effecting a first mode for selecting a type of the printing;

receiving a prescribed command after the first mode is effected;

effecting a second mode for adjusting a printing position relative to the printing medium, when the prescribed command is received:

adjusting the printing position, when the second mode is effected; and effecting the first mode when the adjusting of the printing position is finished, with a condition that is effected when the prescribed command is received.

The method may further comprise displaying an adjustment result of the printing position in an animation manner.

The recording medium may be a portable recording medium.

The printing medium may be a label face of a disk-type recording medium.

The printing medium may be a sheet medium provided with a plurality of peelable areas.

According to one aspect of the invention, there is provided a printing apparatus, operable to read out data from a recording medium and to execute printing based on the readout data, the apparatus comprising:

a first mode executer, operable to effect a first mode for selecting a type of the printing;

a command receiver, adapted to receive a prescribed command after the first mode executer effects the first mode;

a second mode executer, operable to effect a second mode for adjusting a printing position relative to the printing medium, when the command receiver receives the prescribed command;

an adjuster, operable to adjust the printing position, when the second mode executer effects the second mode; and a mode transition controller, operable to effect the first mode when the adjusting of the printing position is finished, with a condition that is effected when the command receiver receives the prescribed command.

According to one aspect of the invention, there is provided a method executed in a printing apparatus operable to read out data from a recording medium and to execute printing based on the read-out data with respect to a printing medium, the method comprising:

effecting a first mode for selecting an image to be printed;

receiving a prescribed command after the first mode is effected;

effecting a second mode for adjusting a printing position relative to the printing medium, when the prescribed command is received;

adjusting the printing position, when the second mode is effected; and effecting the first mode when the adjusting of the printing position is finished, with a condition that is effected when the prescribed command is received.

The method may further comprise displaying an adjustment result of the printing position in an animation manner.

The method may further comprise displaying the image to be printed with a printing range when the first mode is effected.

The recording medium may be a portable recording medium.

The printing medium may be a label face of a disk-type recording medium.

The printing medium may be a sheet medium provided with a plurality of peelable areas.

According to one aspect of the invention, there is provided a printing apparatus, operable to read out data from a recording medium and to execute printing based on the read-out data, the apparatus comprising:

a first mode executer, operable to effect a first mode for selecting an image to be printed;

a command receiver, adapted to receive a prescribed command after the first mode executer effects the first mode;

a second mode executer, operable to effect a second mode for adjusting a printing position relative to the printing medium, when the command receiver receives the prescribed command;

an adjuster, operable to adjust the printing position, when the second mode executer effects the second mode; and a mode transition controller, operable to effect the first mode when the adjusting of the printing position is finished, with a condition that is effected when the command receiver receives the prescribed command.

DETAILED DESCRIPTION OF EXEMPLARY EMBODIMENTS

Exemplary embodiments of the invention will be described below in detail with reference to the accompanying drawings.

Figure 1:
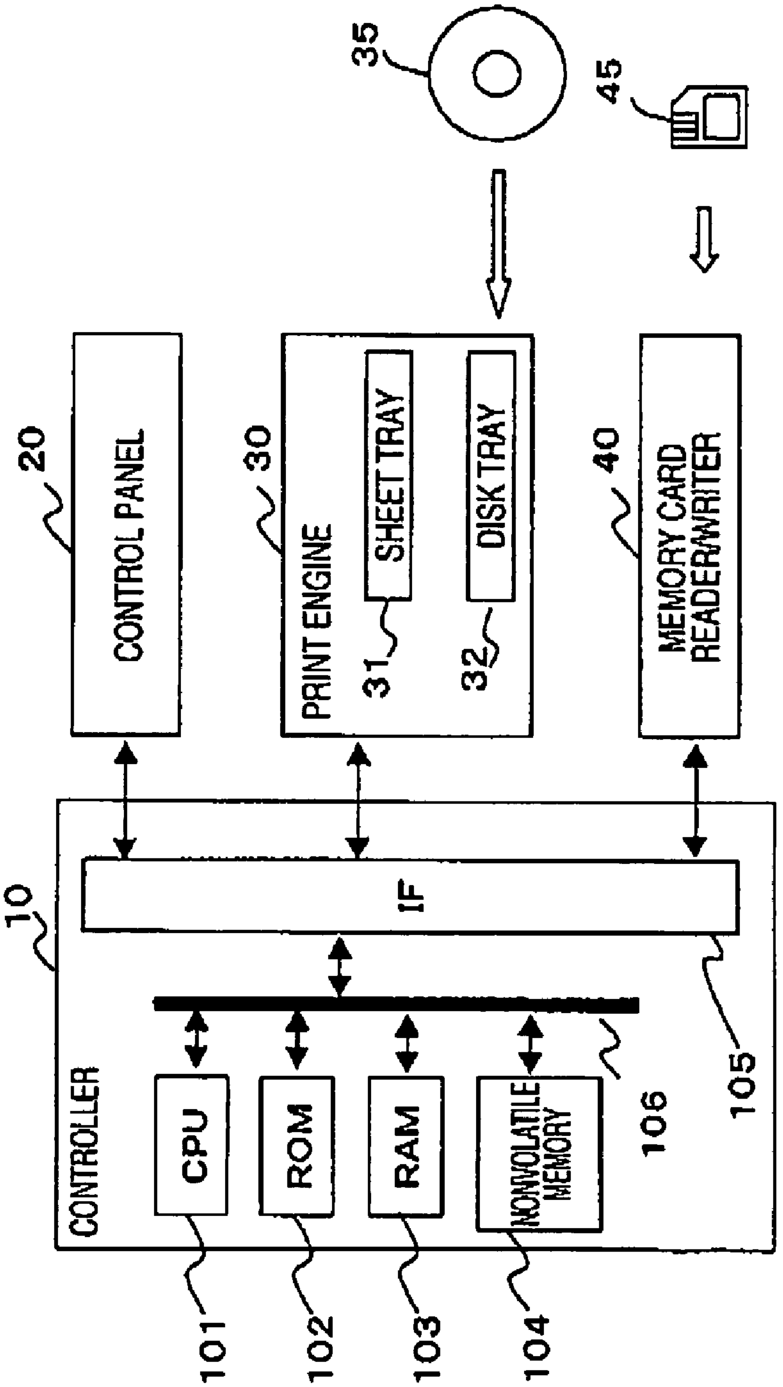
FIG. 1 is a block diagram showing a printer according to one embodiment of the invention.

FIG. 1 shows a printer according to one embodiment of the invention. The printer according to this embodiment is a direct printer that is adapted to be directly connected with a portable recording medium (memory card) 45 without a host computer to perform printing. However, the printer can be connected with a host computer, receive a control command from a printer driver to perform printing. Also, the printer can perform printing using a digital camera as a host.

As shown in FIG. 1, the printer includes a controller 10 for performing a variety of processes for print, a control panel 20, a print engine 30 for performing printing, and a memory card reader/writer 40. Although it will be described in this embodiment that an object on which a label should be printed is a CD-R 35, the object may be a CD-RW, a DVD-R, a DVD-RW, or the like.

The controller 10 includes a CPU 101 as a main controller, a ROM 102 in which programs, etc. are recorded, a RAM 103 as a main memory temporarily storing data, etc., a nonvolatile memory 104 holding stored data even when the printer is deactivated, an interface 105 controlling an input to and an output from the control panel 20, and a system bus 106 serving as a communication path among individual components. The interface 105 may be formed of an ASIC (Application Specific Integrated Circuit) designed to exclusively perform the processes.

The nonvolatile memory (EEPROM) 104 is a device serving to store information which must be held even when the printer is deactivated. The nonvolatile memory 104 stores as "positioning information" the amount of adjusted printing position adjusted as described later. For example, the amount of adjusted position is "1.0 mm to right and 1.0 mm downward."

The control panel 20 includes a liquid crystal display and operation buttons to serve as a user interface for receiving an instruction regarding layout or a selection of an image file to be printed, from a user.

The print engine 30 performs a printing operation based on image data under the control of the controller 10. The print engine 30 includes a sheet tray 31 for loading normal sheets of paper and a disk tray 32 for loading a CD (or DVD). The print engine 30 includes a mechanism for sending the printing medium (sheet or CD) to a position opposing a printing head when label printing is performed.

The memory card reader/writer 40 reads out a file stored in a memory card 45 and sends the read file to the controller 10. The memory card reader/writer 40 serves to delete or update the files stored therein in accordance with a command of the controller 10.

Figure 2:
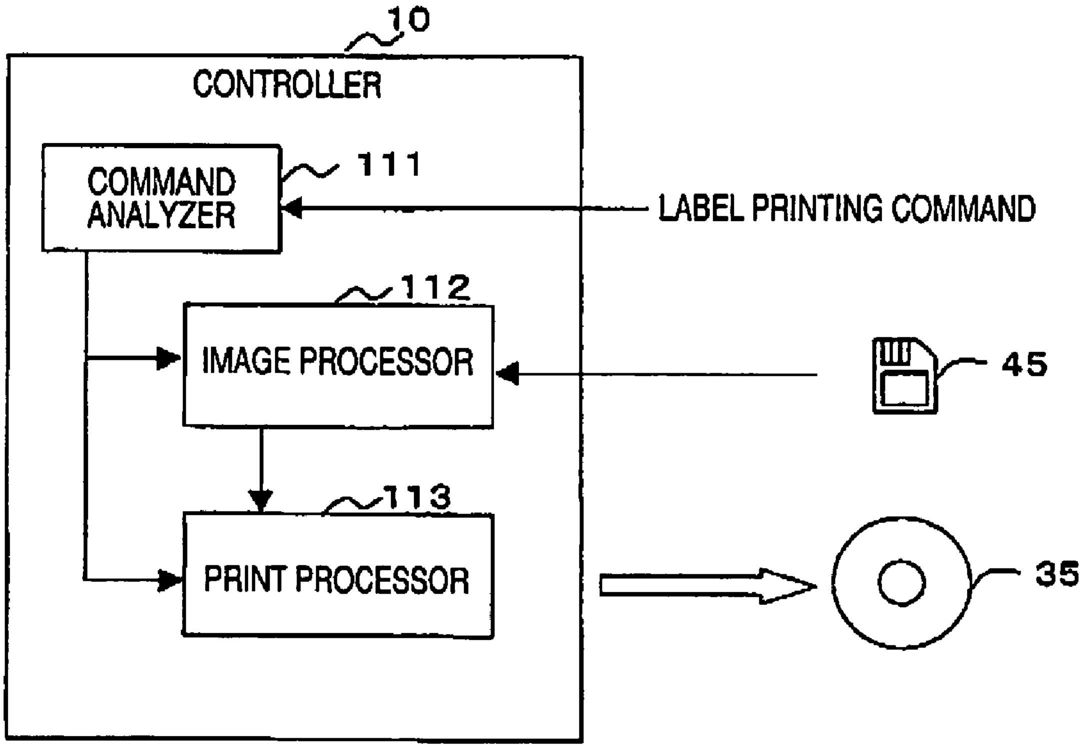
FIG. 2 is a block diagram showing a functional configuration of a controller in the printer.

FIG. 2 shows an example of the functional configuration of the controller 10. Each functional component can be realized in a software or hardware manner.

As shown in FIG. 2, the controller 10 includes a command analyzer 111, an image processor 112, and a print processor 113.

The command analyzer 111 analyzes a user's request input through the control panel 20 and commands the functional parts to perform processes corresponding to the request. For example, when a request for printing a label is received, the command analyzer 111 commands the image processor 112 to perform label printing. The command analyzer 111 receives an instruction for adjustment of a printing position through the control panel 20.

The image processor 112 read image data to be printed from the memory card 45 in accordance with the user's instruction, determines a layout, converts the image data into print data, and then sends the print data to the print processor 113.

The print processor 113 controls the print engine 30 to perform a printing operation. For example, the print processor 113 sends the image data received from the image processor 112 to the print engine 30 so as to print the image data on the label surface of the CD-R 35.

Figure 3:
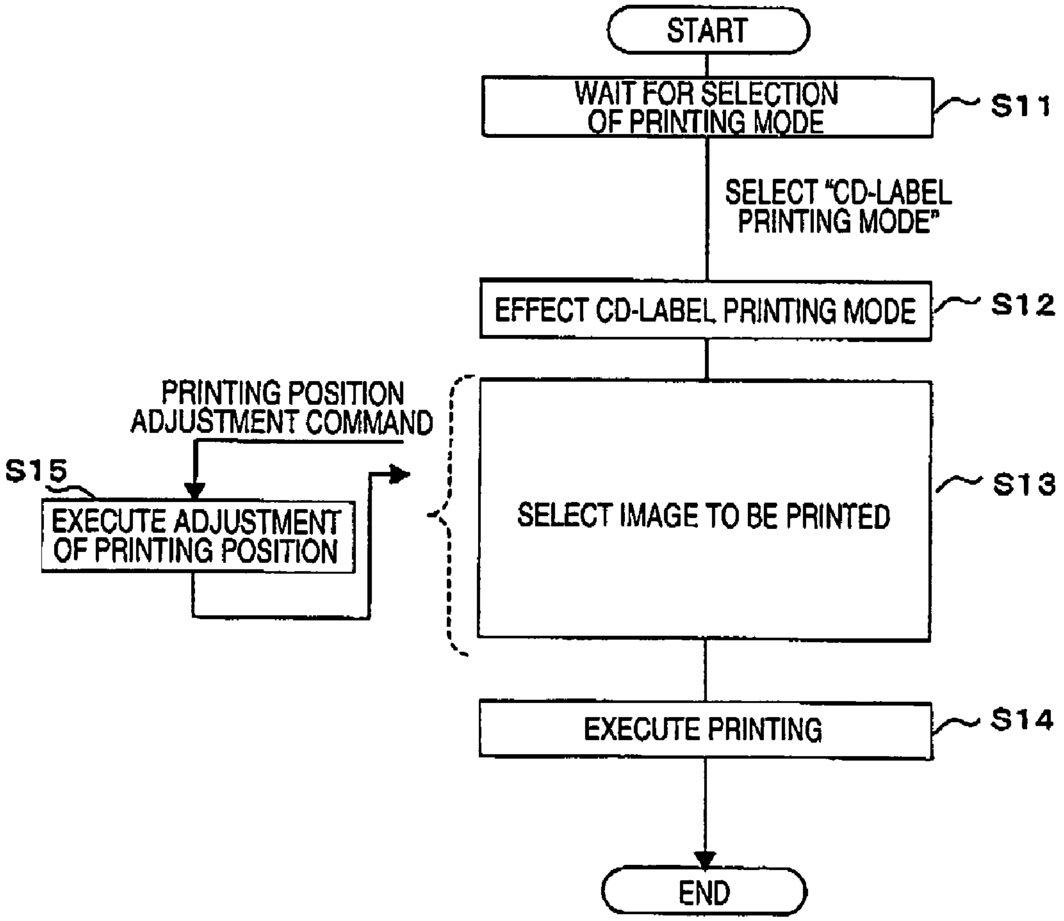
FIG. 3 is a flowchart showing label printing performed in the printer.

Next, operations of the printer having the above-mentioned configuration will be described with reference to FIG. 3.

When the printer is activated, the command analyzer 111 waits for a selection of a printing mode based on the user's operation of the control panel (step S11).

The printing mode includes a "mode in which an image of the memory card 45 is printed on a general sheet of paper" and a "CD label printing mode." Buttons for inputting such modes are provided in the control panel 20.

When the "CD label printing mode" is selected, the command analyzer 111 instructs the image processor 112 to start the CD label printing operation.

Figure 4:
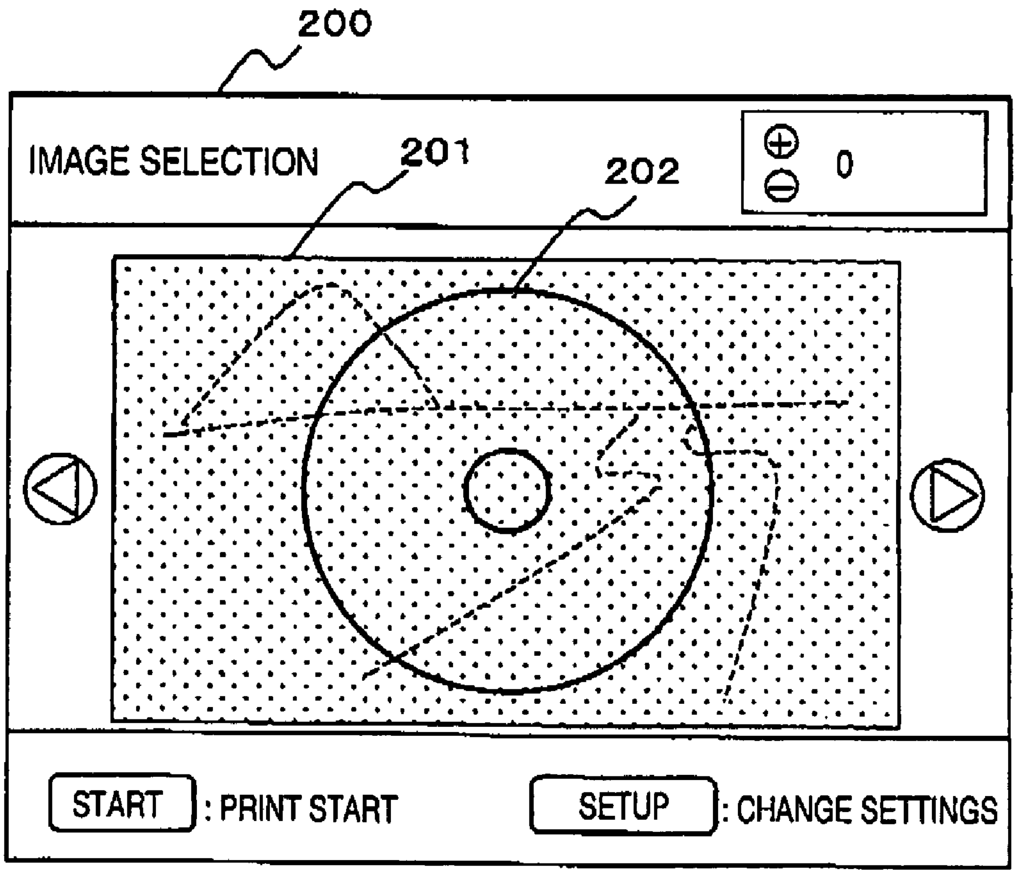
FIG. 4 shows an image selection screen displayed when the label printing is performed.

In response to this instruction, the image processor 112 starts the "CD label printing mode" (step S12) and receives the selection of an image to be printed on the label surface (step S13). Specifically, the image processor 112 displays an image selection screen 200 on a display of the control panel 20, as shown in FIG. 4. In addition, the image processor 112 displays the images 201 read from the memory card 45 one by one on the image selection screen 200. At this time, in order to clarify the printing range with respect to the label surface, the image processor 112 superposes a circular frame 202 corresponding to the shape of the label surface on the displayed image 201. The size and position of the circular frame 202 are determined in advance on the basis of the printing range of the print engine 30.

When a rightward button on the control panel 20 is depressed, the image processor 112 reads a next image from the memory card 45, and displays the read image. On the other hand, when a leftward button on the control panel 20 is depressed, the image processor 112 reads again the image displayed previously, and displays the read image.

When a plus or minus button on the control panel 20 is depressed, the image processor 112 designates number of sheets to be printed. The printing operation can be performed by dividing one label surface into a plurality of regions and assigning one image to each of the regions.

The command analyzer 111 waits for a request for adjusting a printing position from a user while the image processor 112 receives the selection of an image. In this embodiment, the command analyzer 111 displays a menu including the "positioning mode" when the "setup button" of the control panel 20 is depressed. The command analyzer 111 judges that a positioning request is given when the "positioning mode" is selected. The command analyzer 111 may display the menu including the "positioning mode" when the "print setting button" of the control panel 20 is depressed. In this case, when the "positioning mode" is selected, the command analyzer 111 may judge that the positioning request is given.

Figure 5:
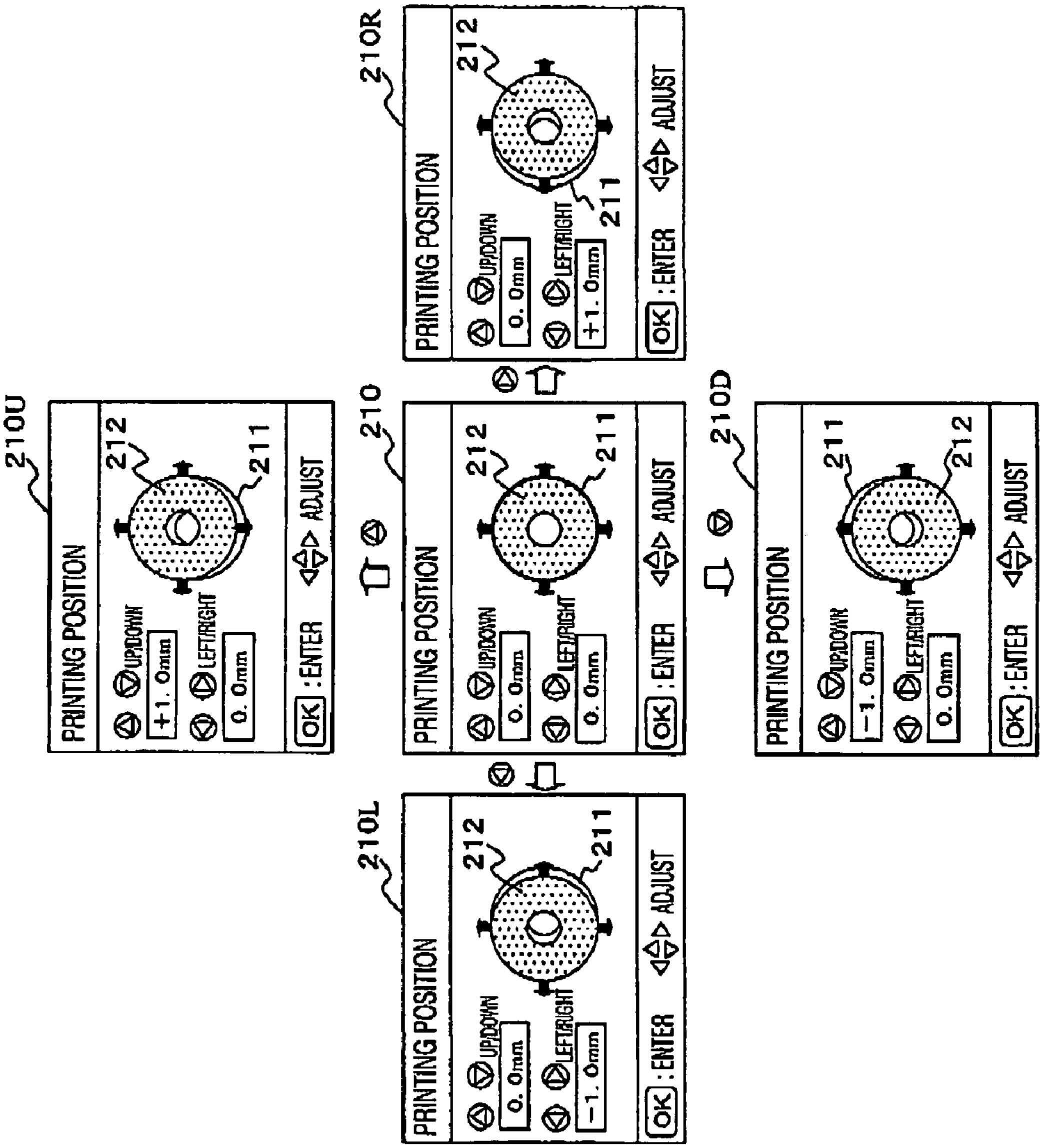
FIG. 5 shows screen transitions of a positioning screen displayed when a positioning mode is effected.

When the positioning request is given, the command analyzer 111 effects the positioning mode (step S15) as shown in FIG. 5.

The command analyzer 111 displays a positioning screen 210 on the display of the control panel 20. An initial printing position 211, an adjusted printing position 212, and an amount of adjustment (an amount of displacement from the initial state) 213 are displayed on the positioning screen 210. The command analyzer 111 receives the adjustment of a printing position by the use of the upward, downward, rightward, and leftward buttons of the control panel 20. When the upward, downward, rightward, and leftward buttons are depressed, the command analyzer 111 increase or decrease the amount of adjustment by a predetermined amount (for example, 0.1 mm by once depressing of a button) in response thereto. Then, by superposing the printing position 212 shifted by the set adjustment amount on the initial printing position, a positional relation therebetween is displayed on the positioning screen 210. Since the set printing position 212 moves in response to the user's depression of the upward, downward, rightward, and leftward buttons, the printing position is displayed in an animation manner.

A screen 210U, a screen 210D, a screen 210L, and a screen 210R show the printing positions moving upward, downward, leftward, and rightward, respectively.

At this time, when the user gives the determination request (when an "OK button" is depressed), the command analyzer 111 stores the set adjustment amount (an amount of upward, downward, leftward, and rightward movements from the initial printing position) as the "positioning information" in the nonvolatile memory 104. Then, the positioning mode is terminated.

Incidentally, the image processor 112 displays again the image selection screen 200 shown in FIG. 4 and receives the selection of an image to be printed. The image processor 112 maintains the state (the displayed image and the number of sheets to be printed for each image) before initiating the positioning mode and restarts the process from the state. That is, the image processor 112 displays the image displayed before initiating the positioning mode on the display. Then, the number sheets to be printed set before initiating the positioning mode is displayed as the number of sheets to be printed.

When a print request is given by a user in the course of the image selection process (step S13) (when the "start button" of the control panel 20 is depressed), the image processor 112 performs the printing operation (step S14).

Specifically, the image processor 112 sequentially reads out images selected as the images to be printed (the images of which the number of sheets to be printed is designated as one or more) from the memory card 45, lays out the images in the form of label, performs a color conversion process to the laid-out images, and then acquires image data for print. The acquired image data are color data with coordinate information.

Next, the image processor 112 shifts the coordinates of the images as a whole on the basis of the "positioning information" so as to perform the printing operation to the position set in the positioning mode.

Accordingly, the image processor 112 first acquires the "positioning information" stored in the nonvolatile memory 104. Then, the image processor 112 horizontally and vertically shifts the coordinates of the images as a whole on the basis of the "positioning information." For example, when the coordinates are shifted upward, the values of the y coordinates of the image data are decreased by the corresponding number of dots.

In this way, the image data to be printed at the positions set in the positioning mode are generated. Thereafter, the image processor 112 sends the generated image data to the print processor 113 to perform the printing operation and then finishes the operation of printing a label.

According to the above-mentioned configuration, when the printing position is adjusted in the course of performing a setting operation in the initially selected printing mode and the adjustment of the printing position is finished, the original printing mode is restored and thus the operations can be performed from the restored state. Accordingly, even when the positioning mode is once effected, it is not necessary to restart the printing operation from the initial state (to start from the initial menu), thereby simplifying the operation.

In the positioning mode, an animation indicating the shift of the printing position in response to the user's instruction is displayed. Accordingly, it can be clearly understood in which direction the printing position is adjusted.

Since the frame (label-shaped circular frame) corresponding to the printing range is displayed in the screen displayed on the display panel, the user can easily understand the print result.

The items to be set up may include an outer diameter and an inner diameter of the CD (DVD) to determine the printing range. That is, when the outer diameter and the inner diameter are set after the label printing mode is effected, the label printing mode before the outer diameter and the inner diameter are set is restored after the setting is finished. Accordingly, it is possible to reduce the user's labor of showing the initial menu again after setting the outer diameter and the inner diameter.

A label frame may be displayed so as to correspond to the set outer and inner diameters of the label. In this case, it is possible to more easily understand the print result.

The invention is not limited to the printing of an outer surface of a recording medium such as a CD-R, but is suitable for printing operations requiring positioning accuracy.

Figure 6:
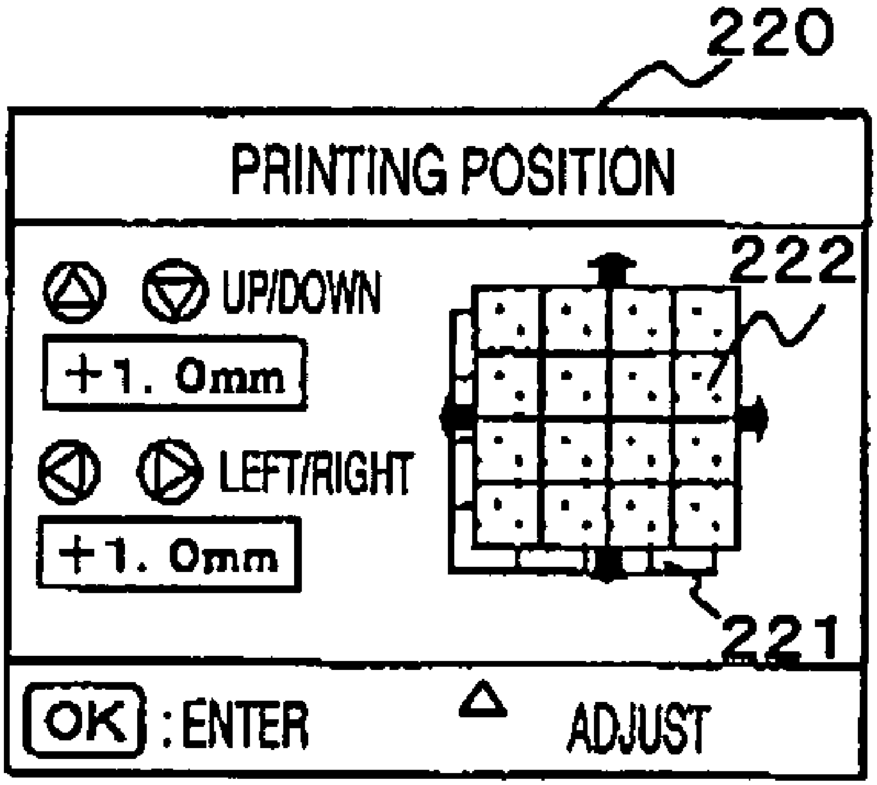
FIG. 6 shows a modified example of the positioning screen.
Figure 7:
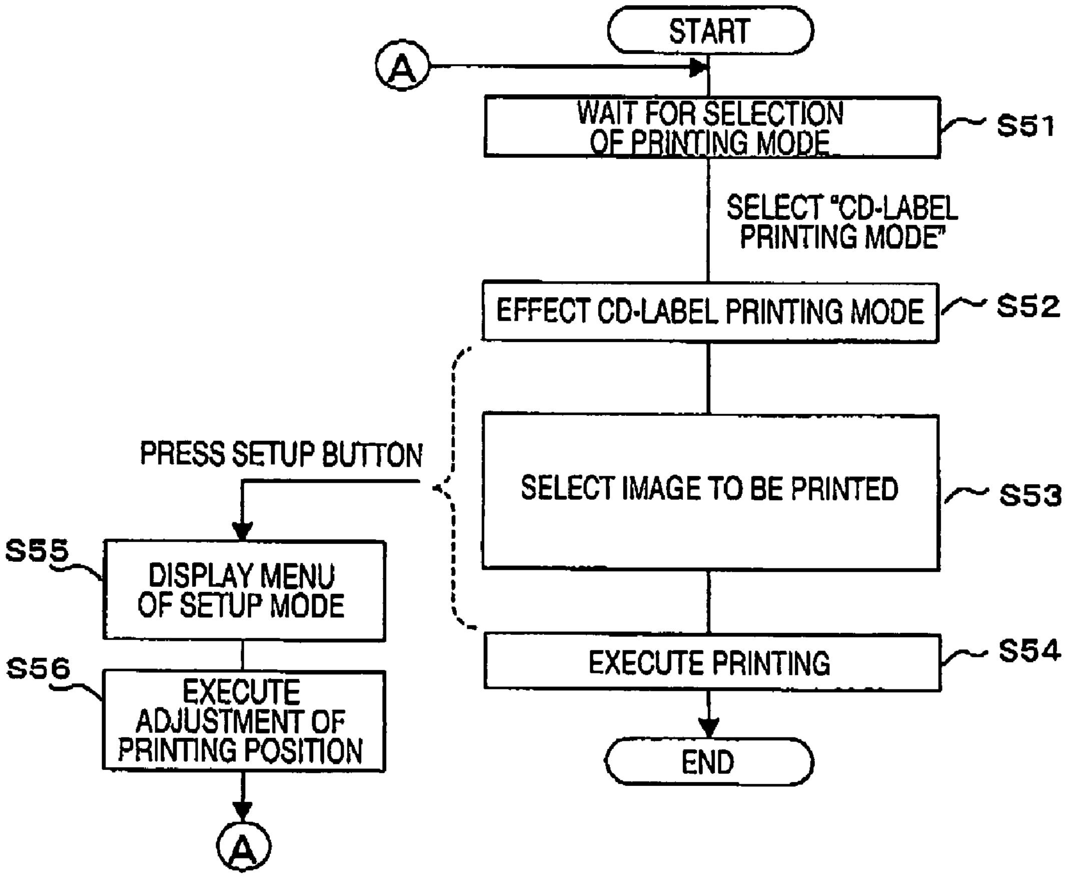
FIG. 7 is a flowchart showing label printing performed in a related-art printer.

For example, the invention can be applied to divided seals (also referred to as "mini photo seals") including cut lines which are prepared to obtain small seals having a plurality of images by once printing operation. FIG. 6 shows an example of the positioning screen 220 in such a positioning mode. In the figure, the adjusted printing position 222 is superposed on the initial printing position 221. The adjusted printing position 212 corresponds to the user's instruction for the upward, downward, rightward, and leftward movement. That is, the printing position is displayed in the animation manner.

A recording medium serving as a backup source is not limited to a memory card, but may be a portable recording medium, such as a USB memory or a small hard disk, capable of being inserted into a digital camera.

In the above embodiments, a printer is exemplified as a printing apparatus. However, the invention is applicable to a hybrid apparatus having the functions of a copier, a scanner, a facsimile, etc.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-16002 filed Jan. 25, 2006 including specification, drawings and claims is incorporated herein by reference in its entirety.

What is claimed is:

1. A method executed in a printing apparatus operable to read out data from a recording medium and to execute printing based on the read-out data with respect to a printing medium, the method comprising:

executing a selecting mode for selecting an image to be printed, with displaying the image and a printing range;

receiving a command in the selecting mode;

adjusting a printing position and the printing range relative to the printing medium, after the command is received;

executing the selecting mode with displaying the image and the adjusted printing range; and displaying an adjustment result of the printing position in an animation manner.

2. The method as set forth in claim 1, further comprising:

displaying the image to be printed with a printing range when the selecting mode is affected.

3. The method as set forth in claim 2, wherein:

the printing range is superposed on the image in the selecting mode.

4. The method as set forth in claim 1, wherein:

the recording medium is a portable recording medium.

5. The method as set forth in claim 1, wherein:

the printing medium is a label face of a disk-type recording medium.

6. The method as set forth in claim 5, wherein:

the printing range corresponds to a size of the disk-type recording medium.

7. The method as set forth in claim 6, wherein the printing range is defined by an inner radius and on outer radius of the disk-type recording medium.

8. The method as set forth in claim 1, wherein:

the printing medium is a sheet medium provided with a plurality of peelable areas.

9. The method as set forth in claim 1, wherein when the selecting mode is executed after the printing position and the printing range are adjusted, another image to be printed is displayed with the adjusted printing range.

10. A printing apparatus, operable to read out data from a recording medium and to execute printing based on the read-out data with respect to a printing medium, the apparatus comprising:

a selecting mode executer, operable to execute a selecting mode for selecting an image to be printed, with displaying the image and a printing range;

a command receiver, adapted to receive a command in the selecting mode;

an adjuster, operable to adjust a printing position and the printing range relative to the printing medium, after the command receiver receives the command;

a mode transition controller, operable to execute the selecting mode with displaying the image and the adjusted printing range; and display controller operable to display an adjustment result of the printing position in an animation manner.

11. The printing apparatus as set forth in claim 10, wherein:

the printing medium is a label face of a disk-type recording medium, and the printing range corresponds to a size of the disk-type recording medium.

12. The printing apparatus as set forth in claim 11, wherein the printing range is defined by an inner radius and an outer radius of the disk-type recording medium.

13. The printing apparatus as set forth in claim 10, wherein the printing range is superposed on the image in the selecting mode.

14. The printing apparatus as set forth in claim 10, wherein after the mode transition controller executes the selecting mode, another image be printed is displayed with the adjusted printing range.

* * * * *